United States Patent
Kim et al.

(10) Patent No.: US 12,497,609 B2
(45) Date of Patent: Dec. 16, 2025

(54) PROTOSPACER ADJACENT MOTIF SEQUENCE AND METHOD FOR MODIFYING TARGET NUCLEIC ACID IN GENOME OF CELL BY USING SAME

(71) Applicant: YONSEI UNIVERSITY BIOHEALTH TECHNOLOGY HOLDINGS. INC., Seoul (KR)

(72) Inventors: Hyong Bum Kim, Seoul (KR); Hui Kwon Kim, Seoul (KR); Na Hye Kim, Tongyeong (KR)

(73) Assignee: YONSEI UNIVERSITY BIOHEALTH TECHNOLOGY HOLDINGS. INC., Seoul (KR)

( * ) Notice: Subject to any disclaimer, the term of this patent is extended or adjusted under 35 U.S.C. 154(b) by 917 days.

(21) Appl. No.: 17/768,359

(22) PCT Filed: Oct. 13, 2020

(86) PCT No.: PCT/KR2020/013946
§ 371 (c)(1),
(2) Date: Apr. 12, 2022

(87) PCT Pub. No.: WO2021/075827
PCT Pub. Date: Apr. 22, 2021

(65) Prior Publication Data
US 2023/0074760 A1  Mar. 9, 2023

(30) Foreign Application Priority Data
Oct. 14, 2019 (KR) .................. 10-2019-0127304

(51) Int. Cl.
| | | |
|---|---|---|
| *C12N 15/10* | (2006.01) | |
| *C12N 9/22* | (2006.01) | |
| *C12N 15/113* | (2010.01) | |
| *C12N 15/85* | (2006.01) | |
| *C12N 15/90* | (2006.01) | |
| *C12Q 1/34* | (2006.01) | |
| *C40B 40/02* | (2006.01) | |
| *C40B 40/06* | (2006.01) | |

(52) U.S. Cl.
CPC ............ *C12N 15/102* (2013.01); *C12N 9/22* (2013.01); *C12N 15/113* (2013.01); *C12N 15/85* (2013.01); *C12N 2310/20* (2017.05)

(58) Field of Classification Search
None
See application file for complete search history.

(56) References Cited

U.S. PATENT DOCUMENTS 10,519,454 B2   12/2019   Kim et al.
2019/0106687 A1   4/2019   Joung et al.
2021/0340528 A1   11/2021   Kim et al.

FOREIGN PATENT DOCUMENTS

| KR | 10-2018-0015731 A | 2/2018 |
| KR | 10-2020-0026164 A | 3/2020 |
| WO | WO 2016/033298 A1 | 3/2016 |
| WO | WO 2018/178994 A1 | 10/2018 |
| WO | WO 2019/161304 A1 | 8/2019 |

OTHER PUBLICATIONS

International Search Report issued Jan. 22, 2021 in PCT/KR2020/013946 filed Oct. 13, 2020.
Korean Notification of Reason of Refusal issued Jan. 24, 2022 in Korean Patent Application No. 10-2020-0131811 filed Oct. 13, 2020, 10 pages (with English Translation).
Karvelis, T., et al., "Rapid characterization of CRISPR-Cas9 protospacer adjacent motif sequence elements", Genome Biology, vol. 16, No. 253, 2015, pp. 1-13.
Slaymaker, I., et al., "Rationally engineered Cas9 nucleases with improved specificity", Science, vol. 351, No. 6268, 2016, pp. 1-10.
Kleinstiver, B., et al., "High-fidelity CRISPR-Cas9 variants with undetectable genome-wide off-targets", Nature, vol. 529, No. 7587, 2016, pp. 1-24.
Chen, J., et al., "Enhanced proofreading governs CRISPT-Cas9 targeting accuracy", Nature, vol. 550, No. 7676, 2017, pp. 1-24.
Casini, A., et al., "A highly specific SpCas9 variant is identified by in vivo screening in yeast", Nat Biotechnol., vol. 36, No. 3, 2018, pp. 1-20.
Lee, J., et al., "Directed evolution of CRISPR-Cas9 to increase its specificity", Nature Communication, vol. 9, No. 3048, 2018, pp. 1-10.
Kleinstiver, B., et al., "Engineered CRISPR-Cas9 nucleases with altered PAM specificities", Nature, vol. 523, No. 7561, 2015, pp. 1-27.
Anders, C., et al., "Structural plasticity of PAM recognition by engineered variants of the RNA-guided endonuclease Cas9", Mol Cell., vol. 61, No. 6, 2016, pp. 1-18.

*Primary Examiner* — Suzanne M Noakes
*Assistant Examiner* — Jae W Lee
(74) *Attorney, Agent, or Firm* — Oblon, McClelland, Maier & Neustadt, L.L.P.

(57) ABSTRACT

Provided are: a method of modifying a target nucleic acid in the genome of a cell by using a novel PAM sequence; and a cell in which a target nucleic acid of the genome of the cell is modified by the method. Accordingly, genome editing may be performed by targeting a position, which has not been previously targeted, as a target for genome editing, and thus the range of applications of genome editing may be expanded.

4 Claims, 17 Drawing Sheets

Specification includes a Sequence Listing.

FIG. 2B e. evoCas9

| RuvC I | Arg | REC1 | REC2 | REC1 | REC3 | RuvC III L1 | HNH | L2 | RuvC III | PI | positions: 1, 60, 94, 174, 308, 495, 718, 765 780, 906 926, 1099, 1368

Mutations: M495V, K526E, Y515N, R661Q f. xCas9(3.7) (initially proposed PAM sequences NG, GAA, GAT)

Mutations: A262T, R324L, S409I, E480K, E543D, M694I, E1219V g. Sniper-Cas9

Mutations: F539S, M763I, K890N h. VQR variant (Initially proposed PAM sequences: NGAN, NGCG)

Mutations: D1135V, R1335Q, T1337R i. VRER variant (Initially proposed PAM sequences : NGCG)

Mutations: D1135E, G1218R, R1335E, T1337R

PROTOSPACER ADJACENT MOTIF SEQUENCE AND METHOD FOR MODIFYING TARGET NUCLEIC ACID IN GENOME OF CELL BY USING SAME

TECHNICAL FIELD

The present disclosure relates to a method of editing the genome of a cell by using a novel protospacer adjacent motif sequence.

BACKGROUND ART

The CRISPR-Cas9 system is an adaptive immune system found in bacteria and archaea and is used for genome editing of various cells including cells of various living organisms and humans. However, in case of the absence of a protospacer adjacent motif (PAM) available in a target DNA region, due to insufficient on-target activity, or off-target effects, etc., applications of the CRISPR-Cas9 system are often limited. A PAM sequence of the most commonly used CRISPR nuclease, Streptococcus pyogenes Cas9 (SpCas9), is 5'-NGG-3'. Other CRISPR nucleases that exhibit efficient activity in mammalian cells may also recognize other PAMs in addition to NGG. CRISPR nuclease variants targeting sequences having no PAM sequence have been developed, but untargeted sequences still exist.

Recently, novel PAM sequences of SpCas9, xCas9, and SpCas9-NG have been identified (KR 10-2020-0026164 A1 (published on Mar. 10, 2020)). However, extensive investigations into target sequences of other Cas9 nuclease variants have not yet been made.

Therefore, in order to broaden the range of applications of the CRISPR-Cas9 system, there is a need to investigate activities of Cas9 nuclease variants against target sequences, to discover PAM sequences other than NGG.

DESCRIPTION OF EMBODIMENTS

Technical Problem

There is provided a method of modifying a target nucleic acid in the genome of a cell by using a novel PAM sequence.

There is provided a cell in which a target nucleic acid of the genome is modified by a method of modifying a target nucleic acid in the genome of a cell by using a novel PAM sequence.

Solution to Problem

An aspect of the present disclosure provides a method of modifying a target nucleic acid in the genome of a cell, the method including incubating a target nucleic acid, a clustered regularly interspaced palindromic repeats-associated (CRISPR-associated: Cas) nuclease or a variant thereof, and a guide RNA.

The cell may be an in vivo cell or an isolated cell. When the cell is an in vivo cell, the method may be performed in vivo. When the cell is an isolated cell, the method may be performed ex vivo or in vitro.

The cell may be a somatic cell, a germ cell, a stem cell, a cancer cell, or a cell line. The cell may be selected from the group consisting of a cancer cell, a stem cell, a vascular endothelial cell, a leukocyte, an immune cell, an epithelial cell, a germ cell, a fibroblast, a muscle cell, a bone marrow cell, an epidermal cell, an osteoblast, and a neuron. The cell may be a cell of animals including humans, plants, bacteria, or fungi.

The genome refers to all genetic information of a living organism or a cell.

The target nucleic acid refers to a nucleic acid to be modified.

The method of modifying the target nucleic acid in the genome of the cell may also be referred to as gene editing or genome editing.

The method may include incubating a cell including a target nucleic acid; a polynucleotide encoding a clustered regularly interspaced short palindromic repeats (CRISPR)-associated (Cas) nuclease or a variant thereof; and a guide RNA.

The target nucleic acid may include a protospacer adjacent motif (PAM) and a target sequence complementary to the guide RNA.

The PAM may include a nucleotide sequence recognized by the Cas nuclease in the target nucleic acid. The PAM may consist of a nucleotide sequence selected from the group consisting of 5'-NAGN-3', 5'-ACGG-3', 5'-AGAS-3', 5'-WGGN-3', 5'-SGRN-3', 5'-TGAD-3', 5'-GTGC-3', 5'-RAGN-3', 5'-CAGH-3', 5'-TAGB-3', 5'-VGAG-3', 5'-NGGN-3', 5'-AAGH-3', 5'-CAGY-3', 5'-GAGN-3', 5'-VAAG-3', 5'-WGRN-3', 5'-RGYG-3', 5'-SGAD-3', 5'-SGGN-3', 5'-TGTG-3', 5'-YGCG-3', 5'-NYGG-3', 5'-NGRN-3', 5'-SGCC-3', 5'-MTGC-3', 5'-GTGH-3', 5'-RCAG-3', 5'-VTAG-3', 5'-WGCC-3', 5'-SACG-3', 5'-NGCD-3', 5'-NARG-3', 5'-WAGA-3', 5'-GAGT-3', 5'-NGTK-3', 5'-NGCN-3', 5'-NACG-3', 5'-AGGY-3', 5'-NGDG-3', 5'-GAGG-3', 5'-GGGT-3', 5'-VYAG-3', 5'-GAAT-3', 5'-NGVN-3', 5'-VACG-3', 5'-AYGA-3', 5'-GAGH-3', 5'-TGTN-3', 5'-AGTB-3', 5'-SGTK-3', 5'-GATG-3', 5'-NGAN-3', 5'-NAAG-3', 5'-NGCG-3', 5'-NGGR-3', 5'-DGGC-3', 5'-NGGT-3', 5'-NGTG-3', and 5'-GGAG-3'. In the nucleotide sequence above, 'A' represents adenine (A), 'G' represents guanine (G), 'C' represents cytosine (C), and 'T' represents thymine (T). 'N' represents A, G, C, T, uracil (U), or unknown or other nucleic acid. 'R' represents purine, and may be A or G. 'Y' represents pyrimidine, and may be C, T, or U. 'M' may be A or C. 'K' may be G, T, or U. 'S' may be G or C. 'W' may be A, T, or U. 'B' represents a base other than A, and may be G, C, T, or U. 'D' represents a base other than C, and may be A, G, T, or U. 'H' represents a base other than G, and may be A, C, T, or U. 'V' represents a base other than T and U, and may be A, G, or C. The PAM may be immediately adjacent or consecutive to the 3'-terminal or the 5'-terminal of the target sequence.

The Cas nuclease may be an endonuclease that cleaves a double-stranded nucleic acid. The Cas nuclease may be an RNA-guided DNA endonuclease. The Cas nuclease may be a nuclease derived from a bacterium selected from the group consisting of Streptococcus sp., Campylobacter sp., Legionella sp., Neisseria sp., Pasteurella sp., Francisella sp., and Prevotella sp. The Cas nuclease may be a nuclease derived from a bacterium selected from the group consisting of Streptococcus pyogenes, Streptococcus thermophilus, Streptococcus aureus, Campylobacter jejuni, Legionella pneumophila, Neisseria meningitidis, Pasteurella multocida, Francisella novicida, and Prevotella disiens. The Cas nuclease may be Cas9, Cpf1, C2c1, C2c2, C2c3, Cas3, Cas5, Cas7, Cas8, or Cas10. The Cas9 may be, for example, Streptococcus pyogenes Cas9 (SpCas9).

The variant of the Cas nuclease may have a function of the Cas nuclease. The variant of the Cas nuclease may be selected from the group consisting of eSpCas9(1.1), SpCas9-HF1, HypaCas9, evoCas9, Sniper-Cas9, SpCas9 VQR variant, SpCas9 VRER variant, SpCas9 VRQR variant, SpCas9 VRQR-HF1 variant, and SpCas9 QQR1 variant.

The eSpCas9(1.1) which is SpCas9 mutated to enhance the specificity may also be referred to as eSpCas9 1.1 or eSpCas9. The eSpCas9(1.1) may have mutations at K848A, K1003A, and R1060A with respect to wild-type SpCas9 (Slaymaker, I. M. et al., Science. 2016 Jan. 1; 351(6268): 84-88).

The SpCas9-HF1 may be SpCas9 mutated to have high-fidelity. The SpCas9-HF1 may have mutations at N497A, R661A, Q695A, and Q926A with respect to wild-type SpCas9 (Kleinstiver, B P et al. Nature. 2016 Jan. 28; 529(7587): 490-495).

The HypaCas9 may be SpCas9 mutated to have hyper-accuracy. The HypaCas9 may have mutations at N692A, M694A, Q695A, and H698A with respect to wild-type SpCas9 (Janice S. Chen et al., Nature. 2017 Oct. 19; 550(7676): 407-410).

The evoCas9 may be SpCas9 mutated to have high-fidelity. The evoCas9 may have mutations at M495V, Y515N, K526E, and R661Q (VNEQ) with respect to wild-type SpCas9 (Antonio Casini et al., Nature Biotechnology, 2018 March; 36(3):265-271).

The Sniper-Cas9 may be SpCas9 mutated to improved specificity of a base editor. The Sniper-Cas9 may have mutations at F539S, M763I, and K890N with respect to wild-type SpCas9 (Jungjoon K. Lee et al., Nature Communications volume 9, Article number: 3048 (2018)).

The SpCas9 VQR variant may be SpCas9 mutated to have specificity to a PAM sequence different from the NGG PAM sequence. The SpCas9 VQR variant may have mutations at D1135V, R1335Q, and T1337R with respect to wild-type SpCas9 (Benjamin P. Kleinstiver et al., Nature. 2015 Jul. 23; 523(7561): 481-485).

The SpCas9 VRER variant may be SpCas9 mutated to have specificity to a PAM sequence different from the NGG PAM sequence. The SpCas9 VRER variant may have mutations at D1135V, G1218R, R1335E, and T1337R with respect to wild-type SpCas9 (Benjamin P. Kleinstiver et al., Nature. 2015 Jul. 23; 523(7561): 481-485).

The SpCas9 VRQR variant may be SpCas9 mutated to have high-fidelity. The SpCas9 VRQR variant may have mutations at D1135V, G1218R, R1335Q, and T1337R with respect to wild-type SpCas9 (Kleinstiver, B. P. et al. Nature. 2016 Jan. 28; 529(7587): 490-495).

The SpCas9 VRQR-HF1 may be SpCas9 mutated to have specificity to a PAM sequence different from the NGG PAM sequence. The SpCas9 VRQR-HF1 may have mutations at N497A, R661A, Q695A, Q926A, D1135V, G1218R, R1335Q, and T1337R with respect to wild-type SpCas9 (Ieinstiver, B. P. et al. Nature. 2016 Jan. 28; 529(7587): 490-495).

The SpCas9 QQR1 may be SpCas9 mutated to have specificity to a PAM sequence different from the NGG PAM sequence. The SpCas9 QQR1 may have mutations at G1218R, N1286Q, I1331F, D1332K, R1333Q, R1335Q, and T1337R with respect to wild-type SpCas9 (Carolin Anders et al., Mol Cell. 2016 Mar. 17; 61(6): 895-902).

The polynucleotide encoding the Cas nuclease or the variant thereof may be contained in a plasmid vector or a viral vector.

When the variant of the Cas nuclease is eSpCas9(1.1), the PAM may be a polynucleotide consisting of a nucleotide sequence selected from the group consisting of 5'-NAGN-3', 5'-ACGG-3', 5'-AGAS-3', 5'-WGGN-3', 5'-SGRN-3', 5'-TGAD-3', and 5'-GTGC-3'.

When the variant of the Cas nuclease is SpCas9-HF1, the PAM may be a polynucleotide consisting of a nucleotide sequence selected from the group consisting of 5'-RAGN-3', 5'-CAGH-3', 5'-TAGB-3', 5'-VGAG-3', and 5'-NGGN-3'.

When the variant of the Cas nuclease is HypaCas9, the PAM may be a polynucleotide consisting of a nucleotide sequence selected from 5'-AAGH-3', 5'-CAGY-3', 5'-GAGN-3', and 5'-NGGN-3'.

When the variant of the Cas nuclease is evoCas9, the PAM may be a polynucleotide consisting of a nucleotide sequence selected from 5'-VAAG-3', 5'-WGRN-3', 5'-RGYG-3', 5'-SGAD-3', 5'-SGGN-3', 5'-TGTG-3', and 5'-YGCG-3'.

When the variant of the Cas nuclease is Sniper-Cas9, the PAM may be a polynucleotide consisting of a nucleotide sequence selected from 5'-NAGN-3', 5'-NYGG-3', 5'-NGRN-3', 5'-SGCC-3', 5'-MTGC-3', and 5'-GTGH-3'.

When the variant of the Cas nuclease is SpCas9 VQR variant, the PAM may be a polynucleotide consisting of a nucleotide sequence selected from 5'-RCAG-3', 5'-VTAG-3', 5'-WGCC-3', 5'-SACG-3', 5'-NGCD-3', 5'-NGRN-3', 5'-NARG-3', 5'-WAGA-3', 5'-GAGT-3', and 5'-NGTK-3'.

When the variant of the Cas nuclease is SpCas9 VRER variant, the PAM may be a polynucleotide consisting of a nucleotide sequence selected from 5'-NGCN-3', 5'-NACG-3', 5'-AGGY-3', 5'-NGDG-3', 5'-GAGG-3', and 5'-GGGT-3'.

When the variant of the Cas nuclease is SpCas9 VRQR variant, the PAM may be a polynucleotide consisting of a nucleotide sequence selected from 5'VYAG-3', 5'-GAAT-3', 5'-NGVN-3', 5'-VACG-3', 5'-WAGA-3', 5'-AYGA-3', 5'-GAGH-3', 5'-NARG-3', 5'-TGTN-3', 5'-AGTB-3', 5'-SGTK-3', and 5'-GATG-3'.

When the variant of the Cas nuclease is SpCas9 VRQR-HF1 variant, the PAM may a polynucleotide consisting of a nucleotide sequence selected from 5'-NGAN-3', 5'-NAAG-3', 5'-RCAG-3', 5'-VTAG-3', 5'-NGCG-3', 5'-NGGR-3', 5'-DGGC-3', 5'-GAGG-3', 5'-NGGT-3', and 5'-NGTG-3'.

When the variant of the Cas nuclease is SpCas9 QQR1 variant, the PAM may be a polynucleotide consisting of a nucleotide sequence selected from 5'-NAAG-3' and 5'-GGAG-3'.

The term "guide RNA" as used herein refers to a polynucleotide that recognizes a target nucleic acid in a cell to cleave, insert, or link the target nucleic acid through genome editing. The guide RNA may include a sequence complementary to the target sequence of the target nucleic acid. The guide RNA may be a polynucleotide complementary to 2 to 24 consecutive nucleotides (hereinafter, referred to as 'nt') in the 5'- or 3'-direction of the PAM in the target nucleic acid. The guide RNA may include 17 nt, 18 nt, 19 nt, 20 nt, 21 nt, 22 nt, 23 nt, or 24 nt in length. The guide RNA may be single-chain guide RNA (sgRNA). The sgRNA may include crRNA (CRISPR RNA) that is specific to the target nucleic acid sequence and/or tracrRNA that forms a complex with Cas nuclease. The guide RNA may be contained in a plasmid vector or a viral vector.

The incubating may include introducing the guide RNA or the polynucleotide encoding the Cas nuclease or the variant thereof into the cell including the target nucleic acid. The introducing may include integration, transformation, transduction, transfection, or a combination thereof. The introducing may be performed in a transient or stable manner.

The target nucleic acid may be recognized by a complex including the Cas nuclease or the variant thereof and the guide RNA.

The complex including the Cas nuclease or the variant thereof and the guide RNA may modify the target nucleic acid sequence-specifically. The modification may include insertion, cleavage, insertion, ligation, deamination, or a combination thereof. The cleavage may be a cleavage of a double strand of the genomic DNA. The cleavage may result in a blunt end or a sticky end. The modification may include cleavage of the target nucleic acid and insertion of a heterogeneous polynucleotide into the cleaved site. The insertion of the heterogeneous polynucleotide into the cleaved site of the genome may be performed by a homology-dependent method. The homology-dependent method may include homologous recombination or homology-directed repair (HDR).

The method disclosed herein may be performed in vitro, ex vivo, or in vivo.

Another aspect of the present disclosure provides a cell in which a target nucleic acid of the genome is modified by a method of modifying a target nucleic acid in the genome of a cell.

Here, the cell, the genome, the target nucleic acid, and the modification are the same as described above.

Advantageous Effects of Disclosure

According to a method of modifying a target nucleic acid in the genome of a cell by using a novel PAM sequence and a cell in which a target nucleic acid of the genome is modified by the method, genome editing may be performed by targeting a position, which has not been previously targeted, as a target for genome editing, and thus the range of applications of genome editing may be expanded.

BRIEF DESCRIPTION OF DRAWINGS

FIGS. 2A to 2C are schematic diagrams of SpCas9 nuclease and variants thereof used in Examples (arrows: positions of mutations compared to wild-type SpCas9, Arg: arginine-rich bridge helix, PI: PAM-interacting domain).

MODE OF DISCLOSURE

Hereinafter, the present disclosure will be described in more detail with reference to Examples below. However, these Examples are for illustrative purposes of one or more embodiments, and the scope of the present disclosure is not limited thereto.

Example 1. Identification of PAM Sequence of SpCas9 Variant

Figure 1:
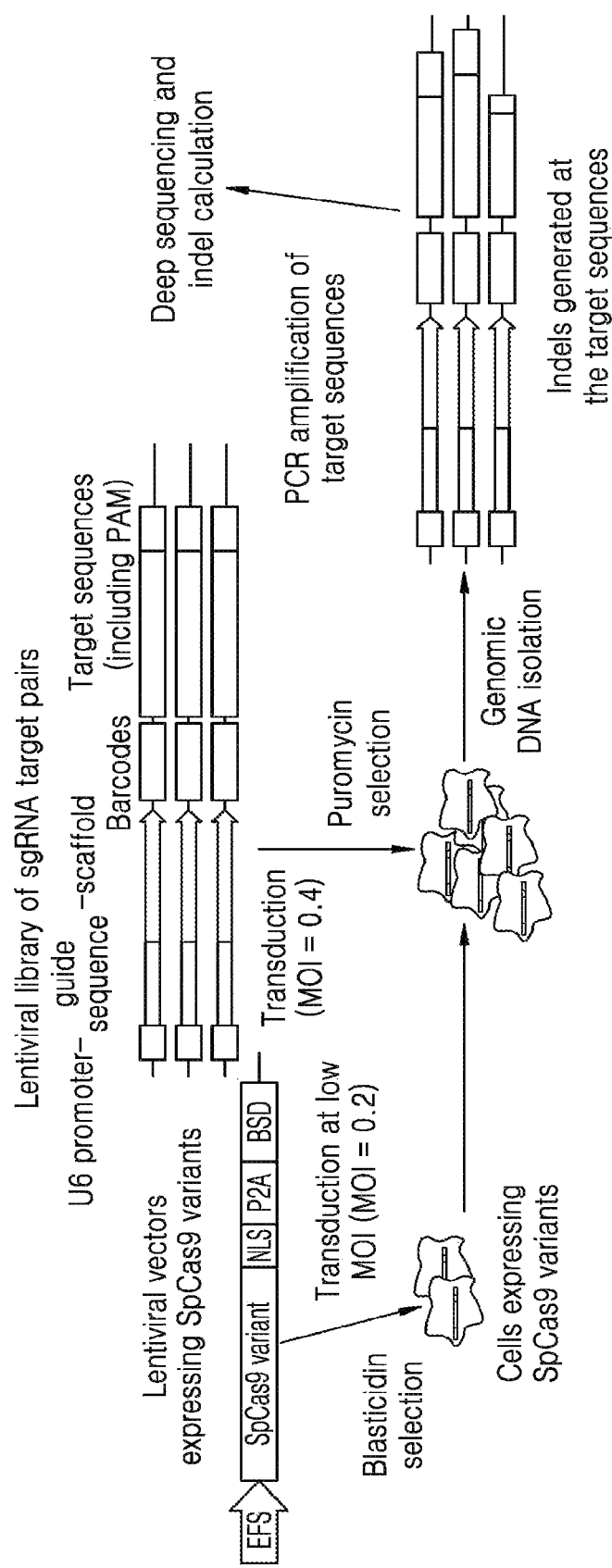
FIG. 1 is a schematic diagram showing an experimental procedure for determining a PAM sequence by using an immobilized protospacer.

1. Preparation of Plasmid Library Containing Guide RNA, PAM Sequence, and Target Sequence To confirm PAM sequences other than NGG, which is an SpCas9 PAM sequence, an oligonucleotide library was prepared by requesting Twist Bioscience Co. (see FIG. 1).

Each oligonucleotide was designed to include 19-nt sgRNA from the 5'-terminal, BsmBI restriction site, barcode 1 (20-nt sequence), second BsmBI restriction site, barcode 2 (15-nt sequence), and a 30-nt target sequence containing 8-nt PAM sequence with random sequences.

First, a library with 8,130 (271×30) target sequences including 271 different 6-nt PAM sequences (256 NNNNTA sequences+16 AGGTNN sequences−1 overlapping AGGGTA sequence) paired with 30 protospacers was produced. Then, $GN_{19}$ protospacers perfectly matched with respect to SpCas9-induced indel frequencies ranging from 38% to 42% were selected. The indel frequencies were determined at 7,314 lentivirally integrated target sequences with NGG PAM sequences 3 days after lentiviral delivery of SpCas9. Here, the range of the indel frequencies was from 0% to 99%. Among 7,314 sgRNAs, 30 species with indel frequencies ranging from 38% to 42% were randomly selected.

Next, 2,940 sgRNAs were designed to validate nuclease activity in mismatched target sequences: 2,940 with NGG PAM=30 sgRNAs×98 targets [1 target without mismatch (5 different barcodes)+60 targets each having 1 base mismatch+19 targets each having 2 base mismatches+18 targets each having 3 base mismatches]; and 732=4 sgRNAs×61 targets [1 target without mismatch (5 different barcodes)+60 targets each having 1 base mismatch]×3 PAMs (NGAG, NAAG and NGCG).

The plasmid library containing the sgRNAs and the target sequences was prevented from uncoupling between the guide RNA and the target sequences during PCR amplification of the oligonucleotide pool by using a two-step cloning method.

The first step is the preparation of an initial plasmid library containing guide RNA and target sequences. Lenti-gRNA-Puro plasmid (Addgene, #84752) was linearized using BsmBI restriction enzyme (NEB), and PCR-amplified oligonucleotide pool (target sequence) was ligated into the linearized vector. The reactant was transformed into E. coli, and the plasmid was isolated from the selected colonies. The primers used to amplify the oligonucleotide pool are as follows:

Forward primer:
(SEQ ID NO: 1)
5'-TTGAAAGTATTTCGATTTCTTGGCTTTATATATCTTGTGGAAAGGACG

AAACACC-3'

Reverse primer:
(SEQ ID NO: 2)
5'-GAGTAAGCTGACCGCTGAAGTACAAGTGGTAGAGTAGAGATCTAGTTA

CGCCAAGCT-3'

The second step is the insertion of a sgRNA scaffold. The plasmid library prepared in the first step was digested with a BsmBI restriction enzyme (NEB), and the resulting nucleic acid fragments were purified on a gel after performing agarose electrophoresis. An insert fragment containing the sgRNA scaffold was synthesized and cloned into a TOPO vector (also referred to as a T-blunt vector, Solgent). The sequence of the insert fragment is shown below, wherein the sgRNA including a poly T sequence is bolded, and the BsmBI restriction enzyme site is underlined.

(SEQ ID NO: 3)
5'-<u>CGTCTCT</u>GTTTTAGAGCTAGAAATAGCAAGTTAAAATAAGGCTAGTCC

GTTATCAACTTGAAAAAGTGGCACCGAGTCGGTGCTTTTTTGGGAGACG-

3'

The TOPO vector containing the insert fragment was digested with a BsmBI restriction enzyme (Enzynomics) to isolate an 83-nt insert fragment. An insert fragment was ligated into the digested plasmid library, and transformed into E. coli. Then, the plasmid library was isolated from selected colonies.

2. Preparation of Cell Library

First, to produce a lentiviral library, HEK293T cells (ATCC), which are human embryonic kidney cells, were prepared. The plasmid prepared in Example 1.1, psPAX2, and pMD2. G were mixed, and then transfected into HEK293T cells using Lipofectamine 2000 (Invitrogen). After 12 hours of the transfection, a fresh medium was added to the cells. After 36 hours of the transfection, a supernatant containing the virus was obtained. The supernatant thus obtained was filtered through a Millex-HV 0.45 μm low-protein binding membrane (Millipore), and the aliquot was stored at −80° C. until use. Here, a virus yield was verified by measuring with a Lenti-X p24 Rapid Titer Kit (Clontech). To calculate virus titer, serially diluted virus aliquots were transduced into HEK293T cells in the presence of 8 μg/ml polybrene, and then cultured in the presence of 2 μg/ml puromycin or 20 μg/ml blasticidin S (InvivoGen).

For transduction of the prepared lentiviral library, HEK293T cells were cultured overnight in a culture dish. The lentiviral library with a multiplicity of infection (MOI) value of of 0.3 was transduced into HEK293T cells in the presence of 8 μg/ml polybrene, and the cells were cultured overnight. The cells were further cultured in the presence of 2 μg/ml puromycin to remove non-transduced cells, and the cell library was maintained at an amount of $1.2 \times 10^7$ cells.

3. Delivery of Cas9 to Cell Library

Figure 2A:
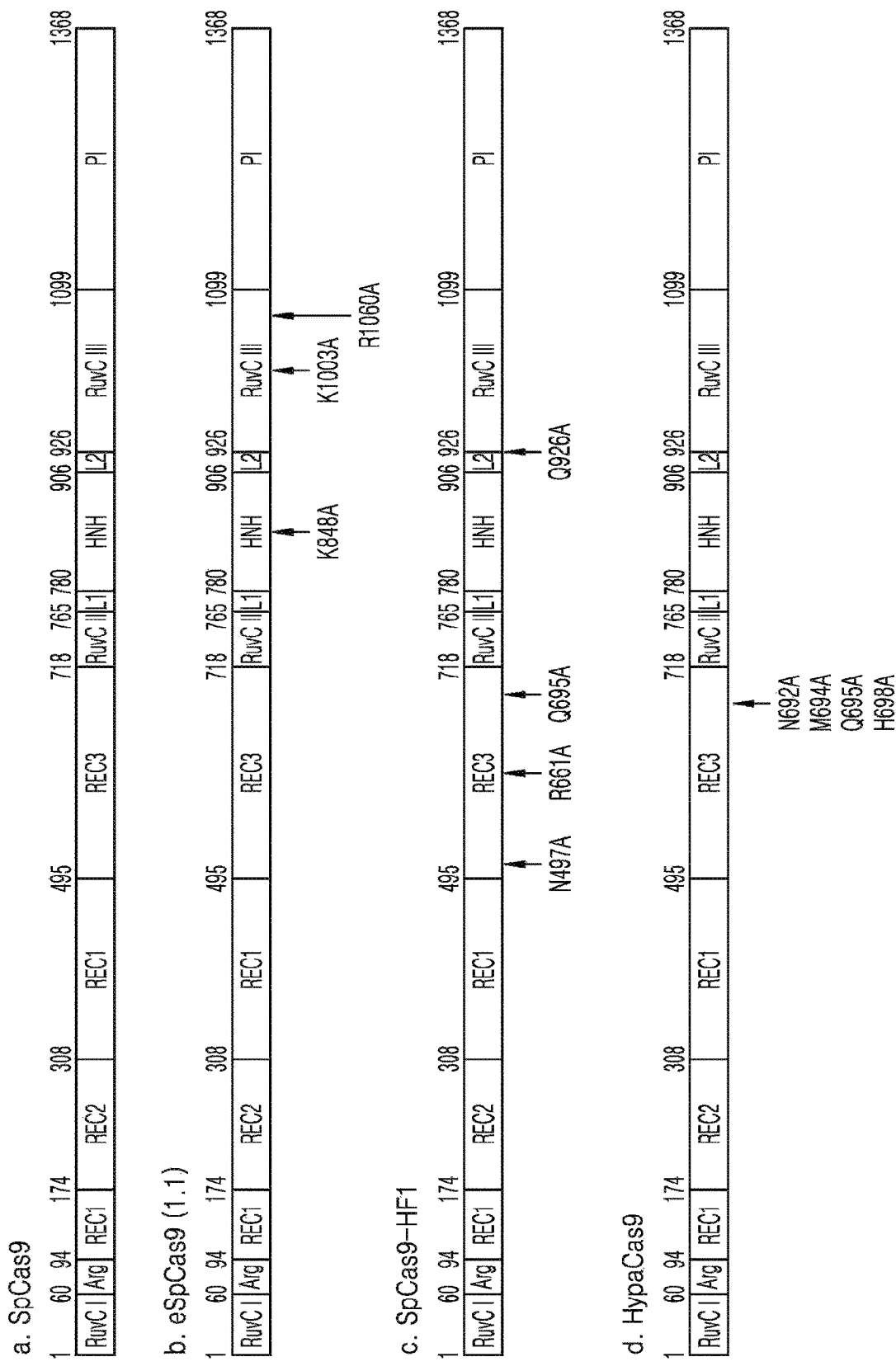
Figure 2C:
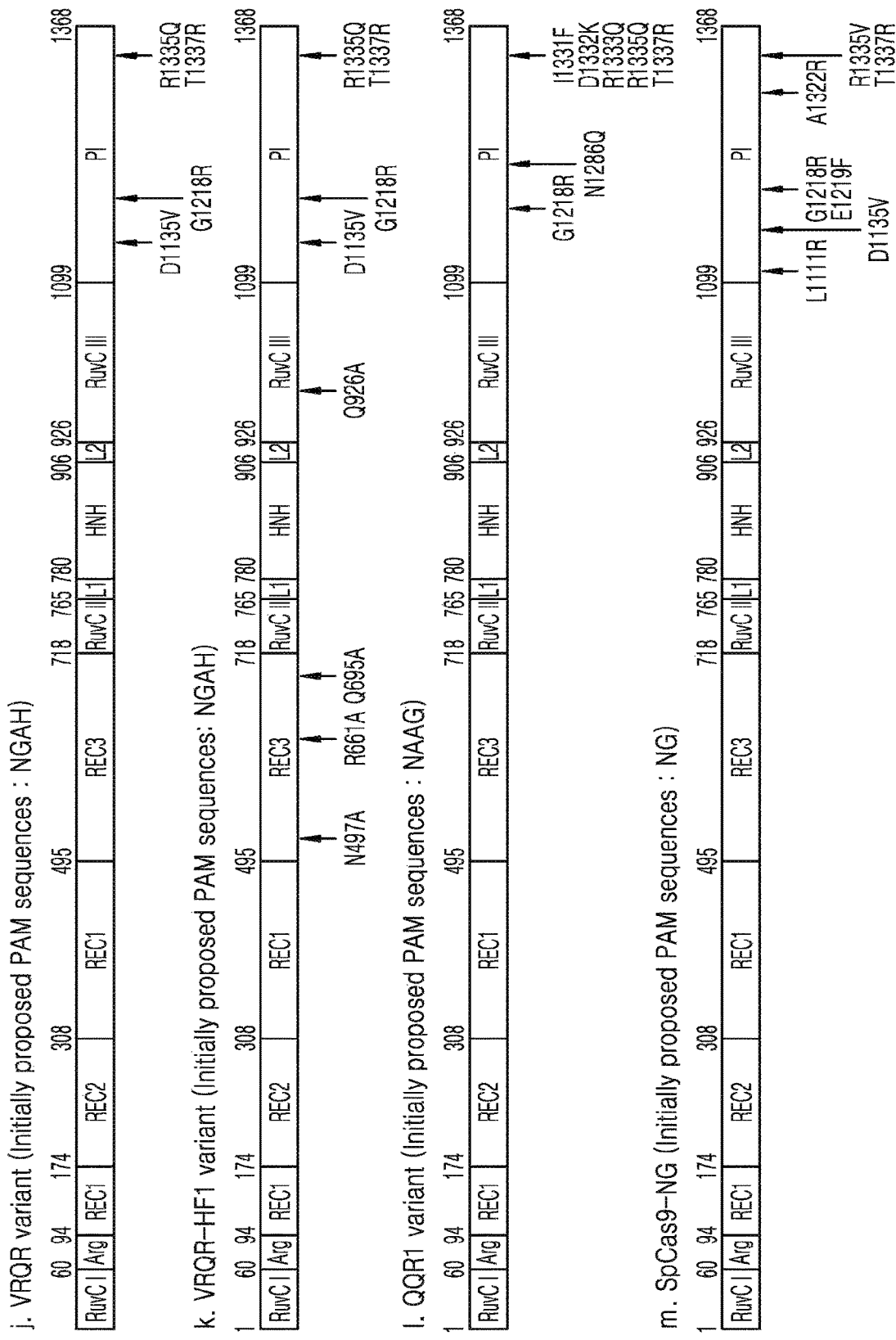
Figure 3:
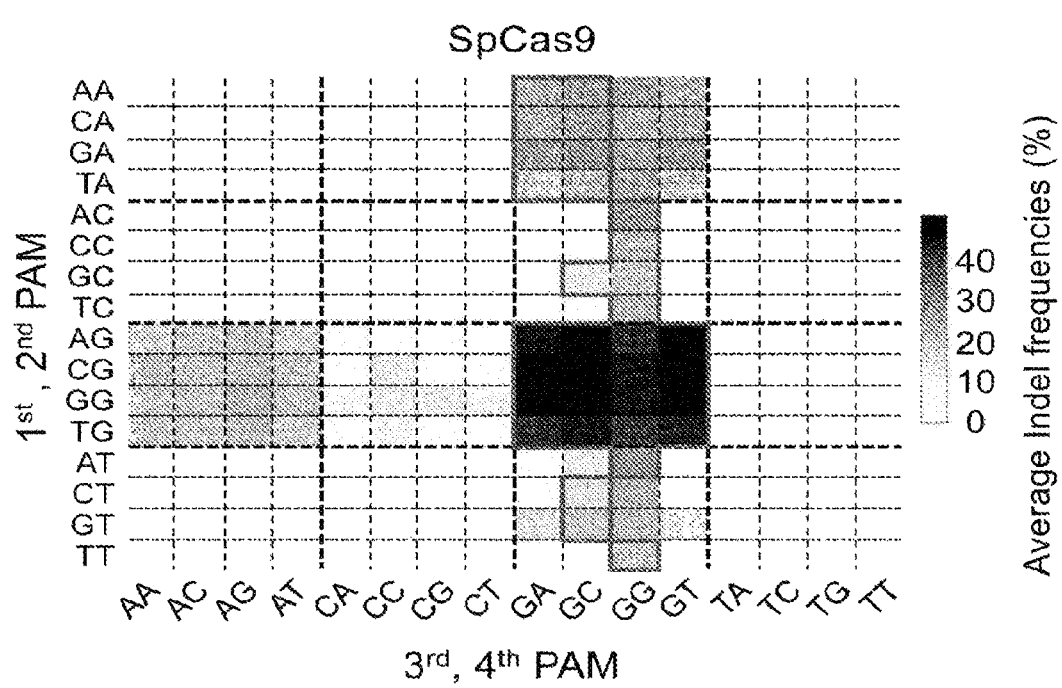
FIGS. 3 to 15 are heat maps showing average indel frequencies induced in 4-nt candidate PAM sequences by SpCas9 nuclease and variants thereof used in Examples.
Figure 4:
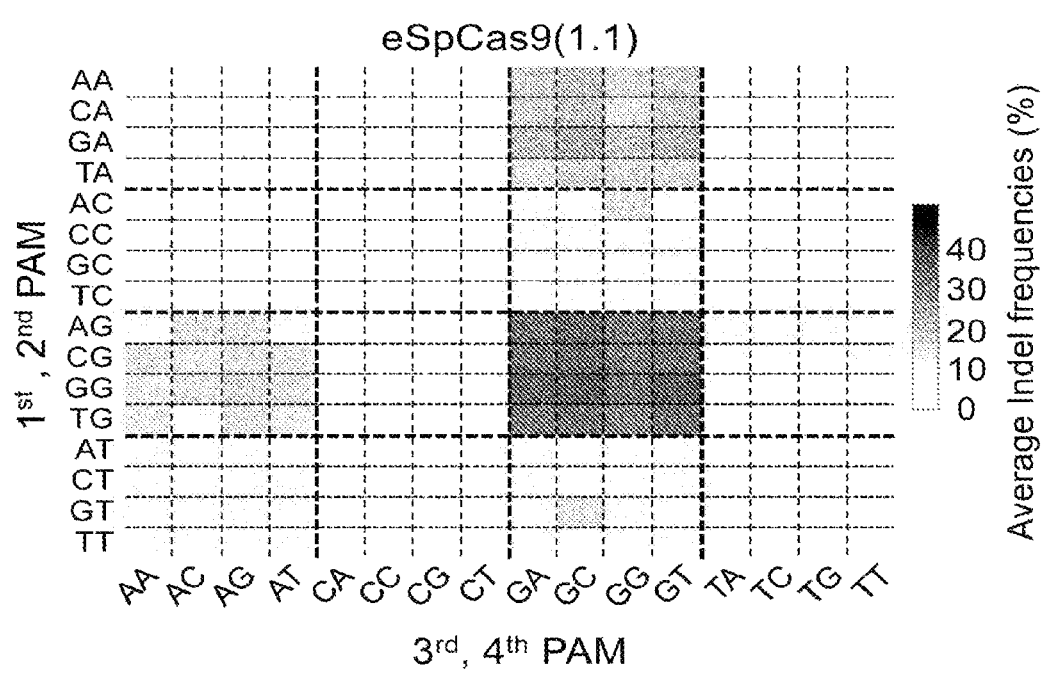
Figure 5:
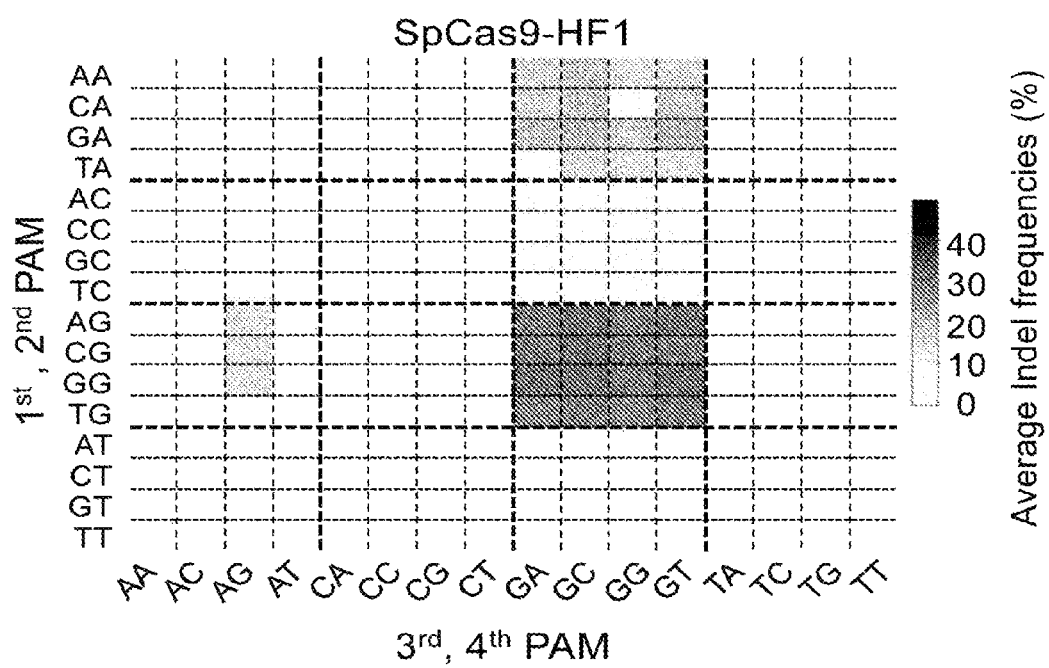
Figure 6:
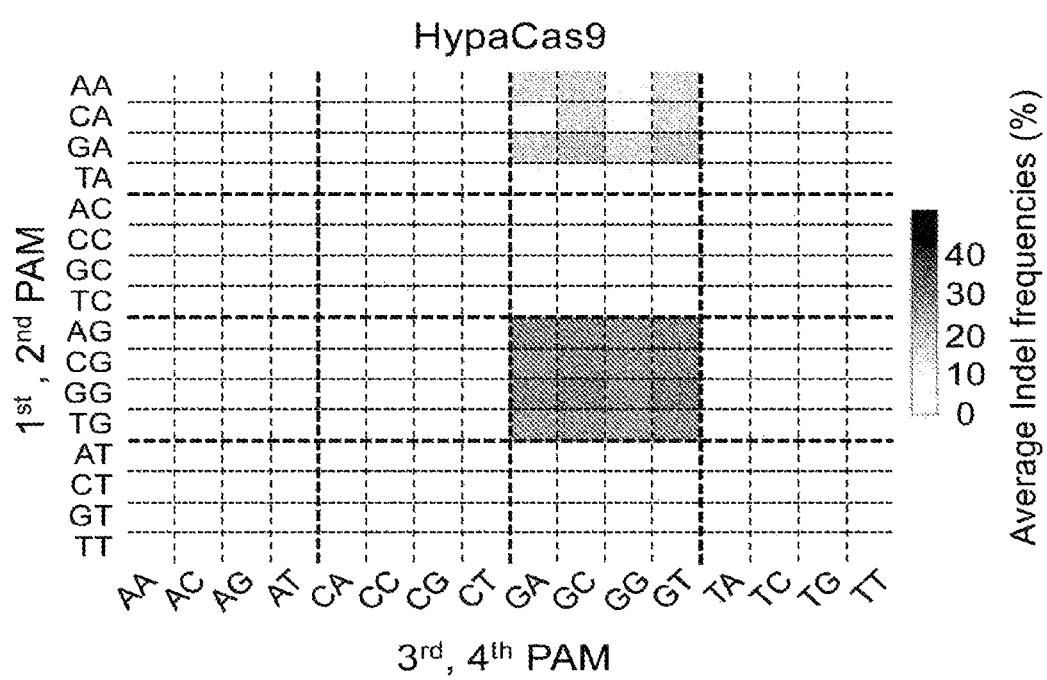
Figure 7:
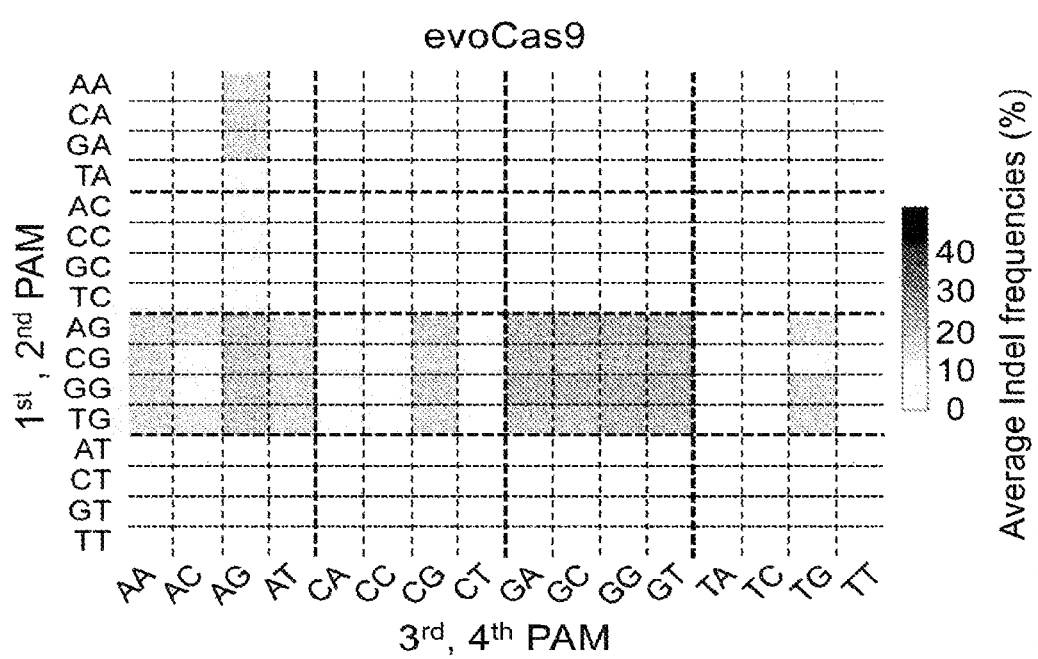
Figure 8:
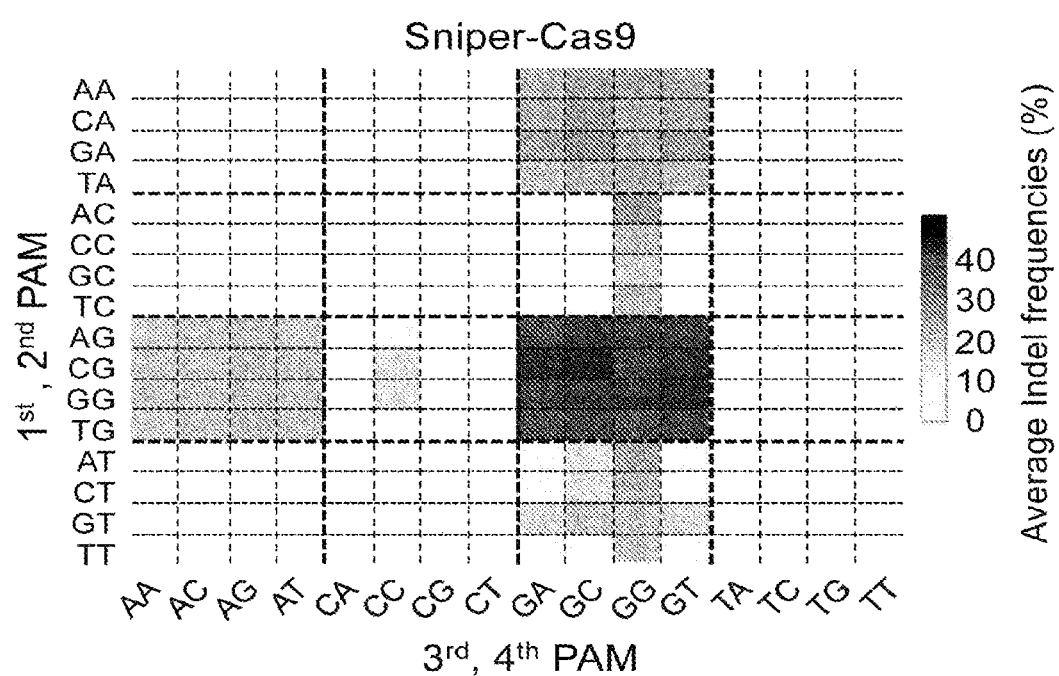
Figure 9:
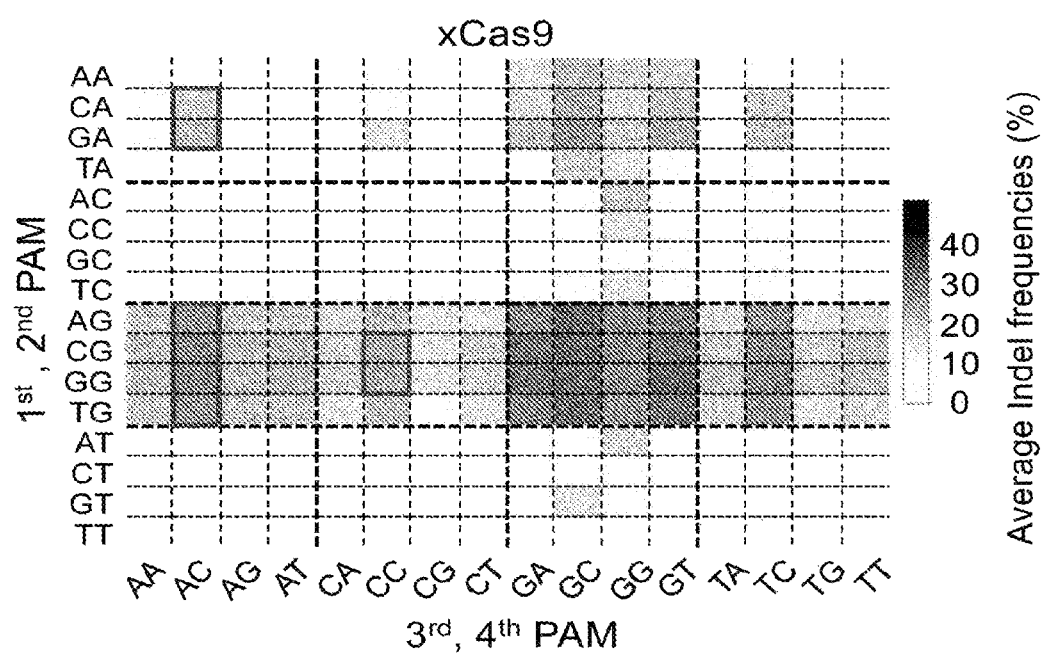
Figure 10:
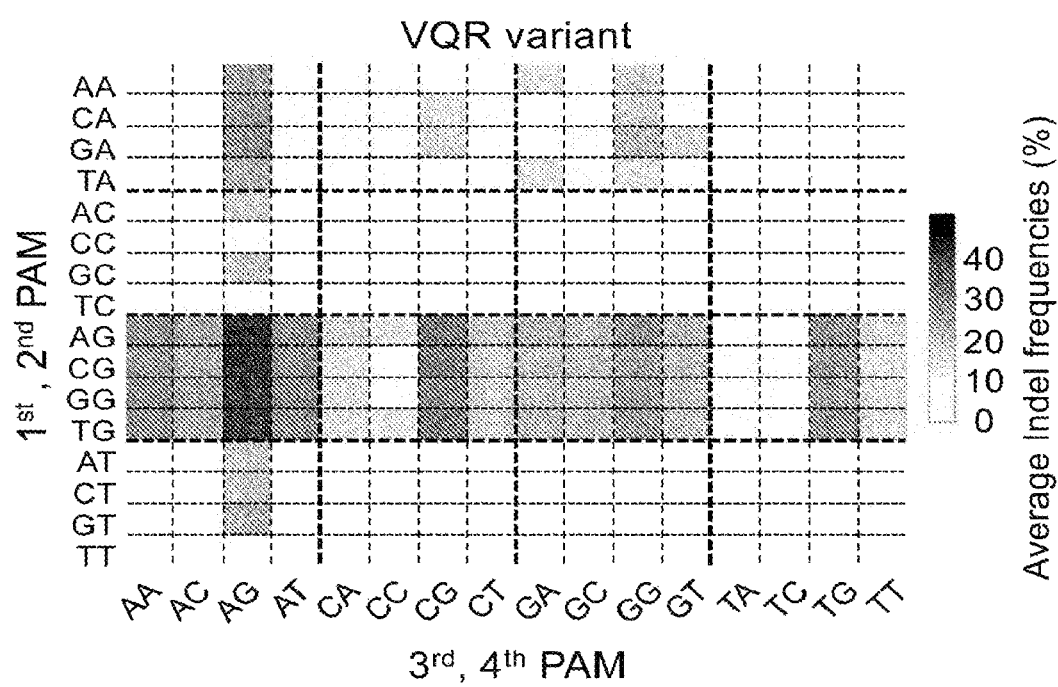
Figure 11:
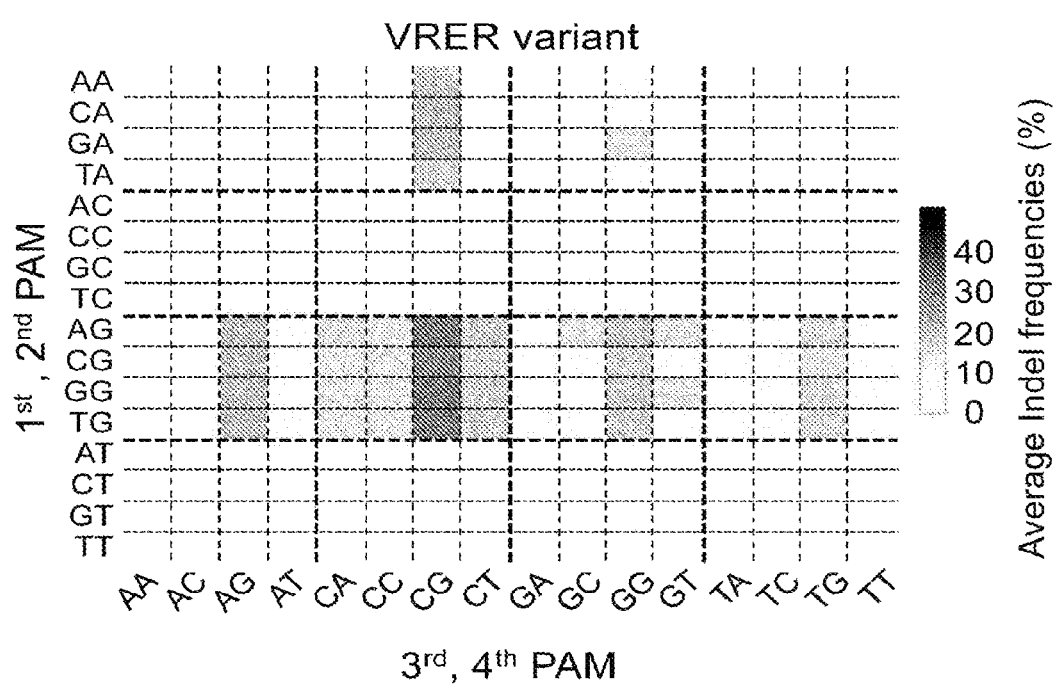
Figure 12:
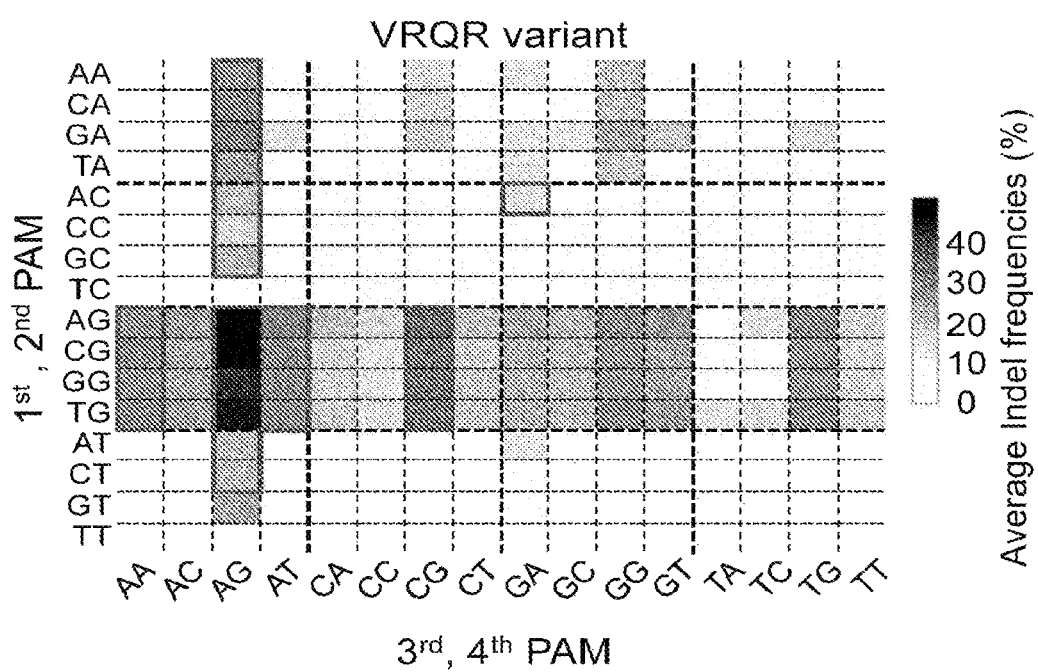
Figure 13:
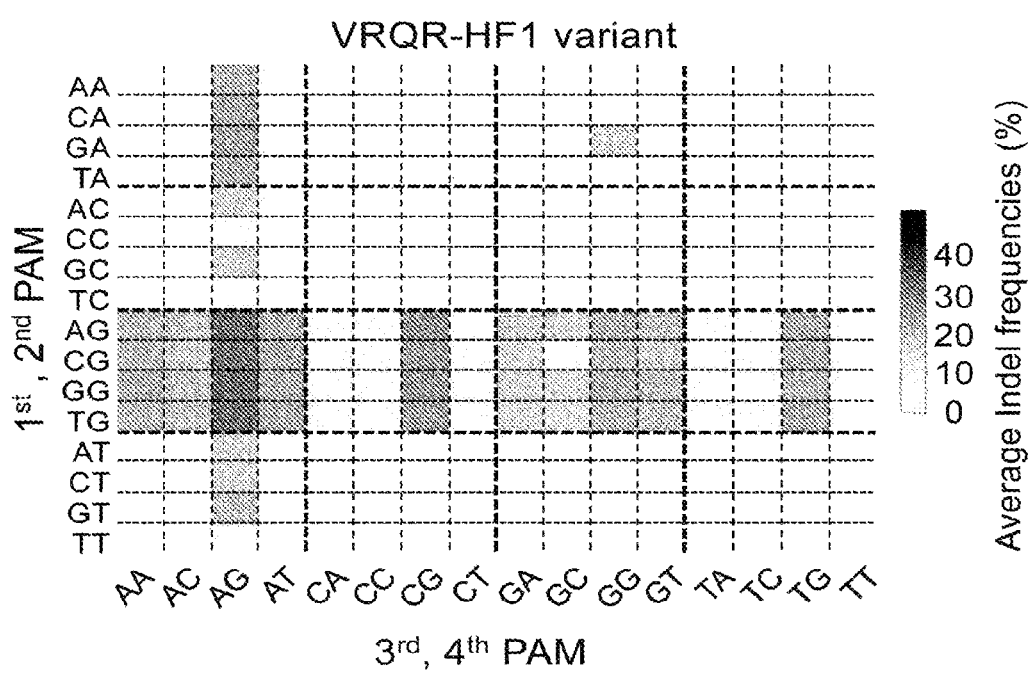
Figure 14:
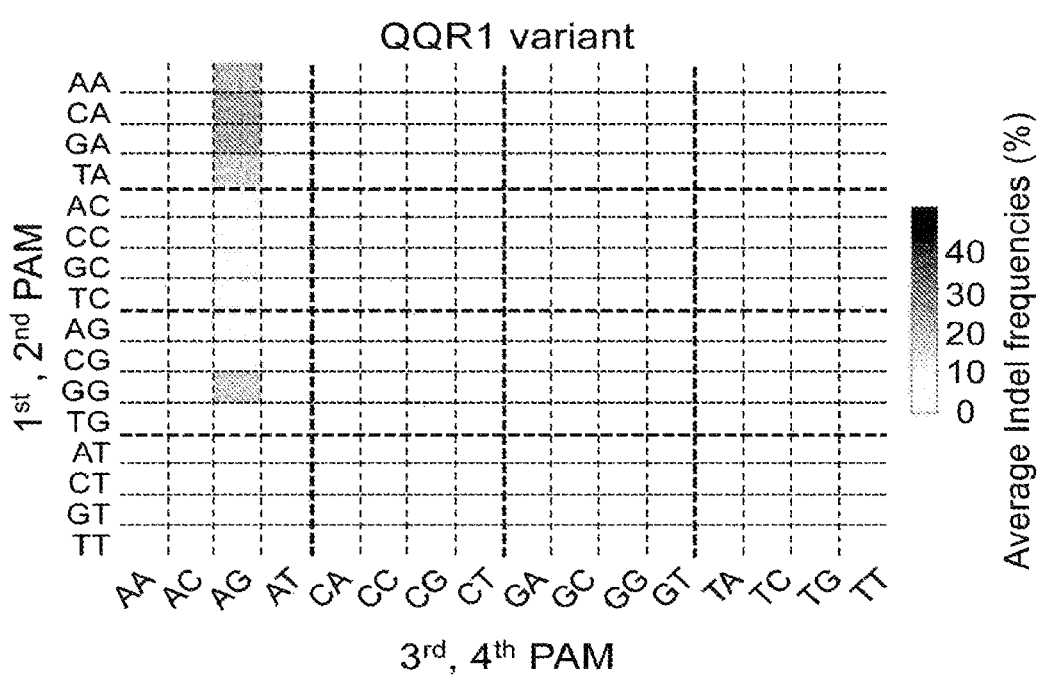
Figure 15:
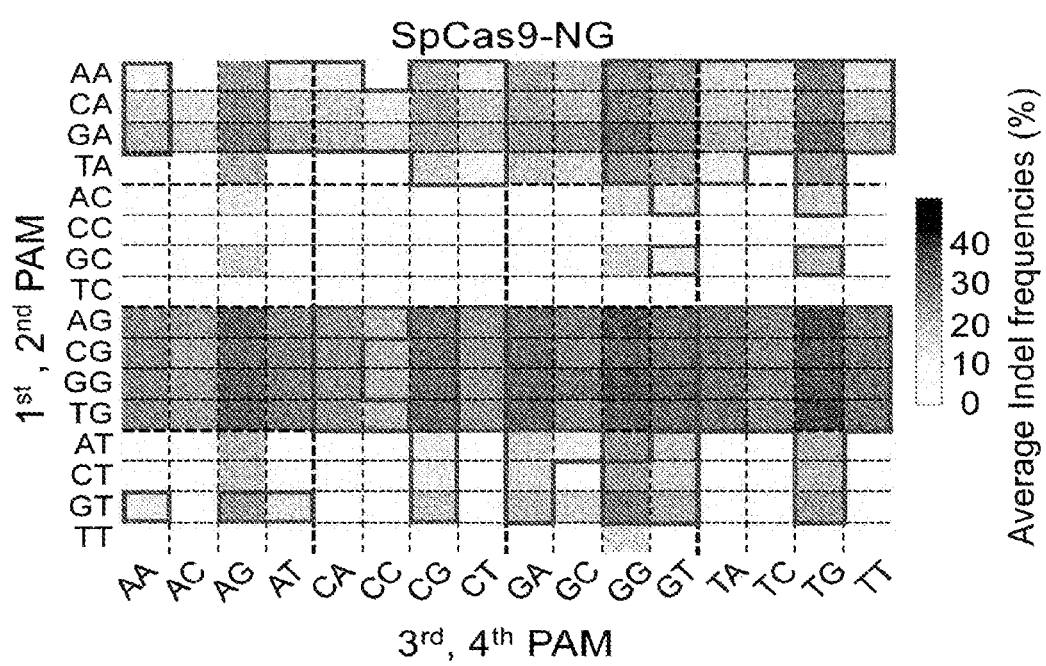

A cell library with $1.2 \times 10^7$ cells was prepared, and viruses encoding SpCas9, eSpCas9(1.1), SpCas9-HF1, HypaCas9, evoCas9, Sniper-Cas9, xCas9, SpCas9 VQR variant, SpCas9 VRER variant, SpCas9 VRQR variant, SpCas9 VRQR variant, SpCas9 VRQR variant, SpCas9 VRQR variant, SpCas9 QQR1 variant, and SpCas9-NG were transduced into cells in the presence of 8 μg/ml polybrene (see FIGS. 2A to 2C). The transduction was performed at MOI value of 5, and the cells were selected in the presence of 20 μg/ml blasticidin S.

4. Measurement of Indel Frequency

To measure the frequency of indels (insertion/deletion (indel)) in the genome of the cells prepared in Example 1.3, deep sequencing and analysis of indel frequencies were performed.

For the deep sequencing, genomic DNA was isolated from the cells using a Wizard Genomic DNA purification kit (Promega). The inserted target sequences were amplified by PCR using 2X Taq PCR Smart mix (Solgent) for high-performance experiments. In the primary PCR, a total of 240 μg of the genomic DNA for each cell library was used to achieve a coverage of 1000× or greater for the library (approximately 10 μg of the genomic DNA per $10^6$ cells). For each reaction, 2.5 μg of the genomic DNA was subjected to primary PCR, and all reaction products were pooled first and then purified. 50 ng of a sample from the purified product was amplified by secondary PCR using a primer containing an Illumina adapter and a barcode sequence. The amplified product was purified after electrophoresis, and then analyzed using HiSeq or MiniSeq (Illumina).

Primers used in the experiment are as follows:

```
Primers for primary PCR
Forward primer:
                         (Forward primer, SEQ ID NO: 4)
5'-ACACTCTTTCCCTACACGACGCTCTTCCGATCTCTTGAAAAAGTGGCA
CCGAGTCG-3'

(SEQ ID NO: 5)
5'-ACACTCTTTCCCTACACGACGCTCTTCCGATCTTCTTGAAAAAGTGGC
ACCGAGTCG-3'

(SEQ ID NO: 6)
5'-ACACTCTTTCCCTACACGACGCTCTTCCGATCTCGCTTGAAAAAGTGG
CACCGAGTCG-3'

Reverse primer:
                                        (SEQ ID NO: 7)
5'-GTGACTGGAGTTCAGACGTGTGCTTCCGATCTTTAAGTCGAGTAAGCT
GACCGCTGAAG-3'

(SEQ ID NO: 8)
5'-GTGACTGGAGTTCAGACGTGTGCTCTTCCGATCTATTAAGTCGAGTAA
GCTGACCGCTGAAG-3'

(SEQ ID NO: 9)
5'-GTGACTGGAGTTCAGACGTGTGCTCTTCCGATCTTATTAAGTCGAGTA
AGCTGACCGCTGAAG-3'

Primers for second PCR
Forward primer:
                                       (SEQ ID NO: 10)
5'-AATGATACGGCGACCACCGAGATCTACACACACTCTTTCCCTACACGA
C-3' (index)

Reverse primer:
                                       (SEQ ID NO: 11)
5'-CAAGCAGAAGACGGCATACGAGATGTGACTGGAGTTCAGACGTGT-3'
(index)
```

For the analysis of indel frequency, the deep sequencing data was analyzed by modifying a Python scripts program. A pair of each guide RNA and a target sequence was identified using a total of 19-nt sequence including a 15-nt barcode and a 4-nt sequence located upstream of the barcode. When an indel was located at an expected cleavage site (i.e., an 8-nt region centered at a cleaved site), the indel was considered as a Cas9-induced mutation. To remove a background indel frequency resulting from the array synthesis and the PCR amplification, total reads, indel reads, and indel frequencies in a case where Cas9 was not introduced were calculated, and the indel frequency (%) was calculated according to the following equation:

$$\text{Indel frequency (\%)} = \frac{\text{Indel read} - (\text{The number of total read} \times \text{Background indel frequency})}{\text{Total read} - (\text{The number of total read} \times \text{Background indel frequency})} \times 100 \quad \text{(Equation 1)}$$

The deep sequencing data was uploaded on the NCBI Sequence Read Archive (SRA, www.ncbi.nlm.nih.gov/sra/) with the Accession No. SRR10215483.

5. Determination of the PAM Sequence

From the deep sequencing data obtained according to Example 1.4, PAM sequences with high indel frequencies in the xCas9, SpCas9-NG, or SpCas9 nuclease were selected.

PAM sequences having an average indel frequency of 5% or more until Day 6 after the transduction into human cells were selected, and the indel frequencies according to the Cas9 nuclease and the variant thereof and the PAM sequence were analyzed.

Heat maps showing average indel frequences induced in 4-nt candidate PAM sequences by SpCas9 (wild-type), eSpCas9(1.1), SpCas9-HF1, HypaCas9, evoCas9, Sniper-Cas9, xCas9, SpCas9 VQR variant, SpCas9 VRER variant, SpCas9 VRQR variant, SpCas9 VRQR-HF1 variant, SpCas9 QQR1 variant, and SpCas9-NG were respectively shown in FIGS. 3 to 15 (one-way ANOVA analysis followed by Tukey post-hoc test). Among the 4-nt candidate PAM sequences (a total of 256 (=$4^4$) candidate sequences), PAM sequences with an average indel frequency of 5% or more are shaded, and sequences with an average indel frequency of less than 5% are shown in white. The PAM sequences with high average indel frequencies are shown within boxes in bold solid lines. Experiments were carried out on all possible 4-nt PAM sequences of 5'-NNNN-3', and analysis was performed using 22 to 30 target sequences for each PAM sequence.

The 4-nt PAM sequences identified by analyzing the heat maps of FIGS. 3 to 15 are shown in Table 1.

TABLE 1

| Cas9 nuclease | PAM sequence |
| --- | --- |
| SpCas9 | 5'-NGRN-3', 5'-NAGN-3', 5'-GGCN-3', 5'-YGCC-3', 5'-GTGH-3', 5'-NYGG-3', 5'-MTGC-3', 5'GCGC-3' |
| eSpCas9(1.1) | 5'-NAGN-3' 5'-ACGG-3', 5'-AGAS-3', 5'-WGGN-3', 5'-SGRN-3', 5'-TGAD-3', 5'GTGC-3' |
| SpCas9-HF1 | 5'-RAGN-3', 5'-CAGH-3', 5'-TAGB-3', 5'-VGAG-3', 5'-NGGN-3' |
| HypaCas9 | 5'-AAGH-3', 5'-CAGY-3', 5'-GAGN-3', 5'-NGGN-3' |
| evoCas9 | 5'-VAAG-3', 5'-WGRN-3', 5'-RGYG-3', 5'-SGAD-3', 5'-SGGN-3', 5'TGTG-3', 5'-YGCG-3' |
| Sniper-Cas9 | 5'-NAGN-3'', 5'-NYGG-3', 5'-NGRN-3', 5'SGCC-3', 5'-MTGC-3', 5'-GTGH-3' |
| xCas9 | 5'-NGDN-3', 5'-VAGN-3', 5'-SAWC-3', 5'-NGCH-3', 5'-VGCG-3', 5'GACC-3', 5'-TAGS-3', 5'-AYGG-3', 5'-YCGG-3', 5'-GTGC-3' |
| SpCas9 VQR | 5'-RCAG-3', 5'-VTAG-3', 5'-WGCC-3', 5'-SACG-3', 5'-NGCD-3', 5'-NGRN-3', 5'-NARG-3', 5'-WAGA-3', 5'-GAGT-3', 5'-NGTK-3' |
| SpCas9 VRER | 5'-NGCN-3', 5'-NACG-3', 5'-AGGY-3', 5'-NGDG-3', 5'-GAGG-3', 5'-GGGT-3' |
| SpCas9 VRQR | 5-VYAG-3', 5'-GAAT-3', 5'-NGVN-3', 5'-VACG-3', 5'-WAGA-3', 5'-AYGA-3', 5'-GAGH-3', 5'-NARG-3', 5'-TGTN-3', 5'-AGTB-3', 5'-SGTK-3', 5'-GATG-3' |
| SpCas9 VRQR-HF1 | 5'-NGAN-3', 5''NAAG-3', 5'-RCAG-3', 5'-VTAG-3', 5'-NGCG-3', 5'-NGGR-3', 5'-DGGC-3', 5'-GAGG-3', 5'-NGGT-3', 5'-NGTG-3' |
| SpCas9 QQR1 | 5'-NAAG-3', 5'-GGAG-3' |
| SpCas9-NG | 5'-NGNN-3', 5'-NAGN-3', 5'-VAHD-3', 5'-SAMC-3', 5'-VATC-3', 5'-TAHG-3', 5'-RCDG-3', 5'-TACT-3', 5'-TATA-3', 5'-VTNG-3', 5'-GTAW-3', 5'-RCGT-3', 5'-VTGW-3', 5'-RTGC-3', 5'-TTGG-3' |

Therefore, by discovering targetable positions in the human genome using the novel PAM sequences and predicting the indel-inducing activity of nucleases according to the PAM sequences, the utility of the genome editing may be increased.

The invention claimed is:

1. A method of modifying a target nucleic acid in the genome of a cell, the method comprising:
    incubating a cell comprising a target nucleic acid; a polynucleotide encoding a clustered regularly interspaced short palindromic repeats (CRISPR)-associated (Cas) nuclease variant,
    wherein the Cas nuclease variant is *Streptococcus pyogenes* Cas9-HF1 (SpCas9-HF1); and a guide RNA, wherein the target nucleic acid comprises a protospacer adjacent motif (PAM) and a target sequence complementary to the guide RNA,
    the PAM consists of a nucleotide sequence selected from the group consisting of 5'-RAGN-3', 5'-CAGH-3', 5'-TAGB-3', 5'-VGAG-3', and 5'-NGGN-3',
    the target nucleic acid can be recognized by a complex comprising: the SpCas9-HF1; and the guide RNA, and
    the complex comprising the SpCas9-HF1 and the guide RNA modifies the target nucleic acid sequence-specifically.

2. The method of claim 1, wherein the guide RNA is a polynucleotide complementary to 2 to 24 consecutive nucleotide sequences in the 5'- or 3'-direction of the PAM in the target nucleic acid.

3. The method of claim 1, the length of the guide RNA is 17 to 24 nucleotides.

4. The method of claim 1, the modification is cleavage, insertion, ligation, deamination, or a combination thereof.

* * * * *

```
                              SEQUENCE LISTING

<160> NUMBER OF SEQ ID NOS: 11

<210> SEQ ID NO 1
<211> LENGTH: 55
<212> TYPE: DNA
<213> ORGANISM: Artificial Sequence
<220> FEATURE:
<223> OTHER INFORMATION: Forward primer for oligonucelotide pool
      amplification

<400> SEQUENCE: 1
ttgaaagtat tcgatttct tggctttata tatcttgtgg aaaggacgaa acacc          55

<210> SEQ ID NO 2
<211> LENGTH: 57
<212> TYPE: DNA
<213> ORGANISM: Artificial Sequence
<220> FEATURE:
<223> OTHER INFORMATION: Reverse primer for oligonucelotide pool
      amplification

<400> SEQUENCE: 2
gagtaagctg accgctgaag tacaagtggt agagtagaga tctagttacg ccaagct       57

<210> SEQ ID NO 3
<211> LENGTH: 97
<212> TYPE: DNA
<213> ORGANISM: Artificial Sequence
<220> FEATURE:
<223> OTHER INFORMATION: Insert fragment containing the sgRNA scaffold

<400> SEQUENCE: 3
cgtctctgtt ttagagctag aaatagcaag ttaaaataag gctagtccgt tatcaacttg    60
aaaaagtggc accgagtcgg tgcttttttg ggagacg                             97

<210> SEQ ID NO 4
<211> LENGTH: 56
<212> TYPE: DNA
<213> ORGANISM: Artificial Sequence
<220> FEATURE:
<223> OTHER INFORMATION: Forward primer for 1st PCR reaction

<400> SEQUENCE: 4
acactctttc cctacacgac gctcttccga tctcttgaaa aagtggcacc gagtcg        56

<210> SEQ ID NO 5
<211> LENGTH: 57
<212> TYPE: DNA
<213> ORGANISM: Artificial Sequence
<220> FEATURE:
<223> OTHER INFORMATION: Forward primer for 1st PCR reaction

<400> SEQUENCE: 5
acactctttc cctacacgac gctcttccga tcttcttgaa aaagtggcac cgagtcg       57

<210> SEQ ID NO 6
<211> LENGTH: 58
<212> TYPE: DNA
<213> ORGANISM: Artificial Sequence
<220> FEATURE:
```

<223> OTHER INFORMATION: Forward primer for 1st PCR reaction

<400> SEQUENCE: 6
acactctttc cctacacgac gctcttccga tctcgcttga aaaagtggca ccgagtcg  58

<210> SEQ ID NO 7
<211> LENGTH: 61
<212> TYPE: DNA
<213> ORGANISM: Artificial Sequence
<220> FEATURE:
<223> OTHER INFORMATION: Reverse primer for 1st PCR reaction

<400> SEQUENCE: 7
gtgactggag ttcagacgtg tgctcttccg atctttaagt cgagtaagct gaccgctgaa  60
g  61

<210> SEQ ID NO 8
<211> LENGTH: 62
<212> TYPE: DNA
<213> ORGANISM: Artificial Sequence
<220> FEATURE:
<223> OTHER INFORMATION: Reverse primer for 1st PCR reaction

<400> SEQUENCE: 8
gtgactggag ttcagacgtg tgctcttccg atctattaag tcgagtaagc tgaccgctga  60
ag  62

<210> SEQ ID NO 9
<211> LENGTH: 63
<212> TYPE: DNA
<213> ORGANISM: Artificial Sequence
<220> FEATURE:
<223> OTHER INFORMATION: Reverse primer for 1st PCR reaction

<400> SEQUENCE: 9
gtgactggag ttcagacgtg tgctcttccg atcttattaa gtcgagtaag ctgaccgctg  60
aag  63

<210> SEQ ID NO 10
<211> LENGTH: 49
<212> TYPE: DNA
<213> ORGANISM: Artificial Sequence
<220> FEATURE:
<223> OTHER INFORMATION: Forward primer for 2nd PCR reaction

<400> SEQUENCE: 10
aatgatacgg cgaccaccga gatctacaca cactctttcc ctacacgac  49

<210> SEQ ID NO 11
<211> LENGTH: 45
<212> TYPE: DNA
<213> ORGANISM: Artificial Sequence
<220> FEATURE:
<223> OTHER INFORMATION: Reverse primer for 2nd PCR reaction

<400> SEQUENCE: 11
caagcagaag acggcatacg agatgtgact ggagttcaga cgtgt  45